United States Patent
Park et al.

(10) Patent No.: US 12,118,458 B2
(45) Date of Patent: Oct. 15, 2024

(54) INFERENCE METHOD AND DEVICE USING SPIKING NEURAL NETWORK

(71) Applicant: Samsung Electronics Co., Ltd., Suwon-si (KR)

(72) Inventors: Byung-Gook Park, Seoul (KR); Sungmin Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1008 days.

(21) Appl. No.: 16/693,029

(22) Filed: Nov. 22, 2019

(65) Prior Publication Data
US 2020/0257973 A1  Aug. 13, 2020

(30) Foreign Application Priority Data
Feb. 12, 2019  (KR) .................. 10-2019-0016291

(51) Int. Cl.
  *G06N 3/08*  (2023.01)
  *G06N 3/049*  (2023.01)
  *G06N 3/06*  (2006.01)
  *G06N 5/04*  (2023.01)

(52) U.S. Cl.
  CPC .............. *G06N 3/08* (2013.01); *G06N 3/049* (2013.01); *G06N 3/06* (2013.01); *G06N 5/04* (2013.01)

(58) Field of Classification Search
  CPC ............ G06N 3/08; G06N 3/049; G06N 3/06; G06N 5/04; G06N 3/0454; G06N 3/063; G06N 3/04
  See application file for complete search history.

(56) References Cited

U.S. PATENT DOCUMENTS

2016/0275397 A1  9/2016  Neil et al.
2017/0213129 A1  7/2017  Lee
2018/0121802 A1*  5/2018  Ruckauer ............... G06N 3/049

FOREIGN PATENT DOCUMENTS

| KR | 10-2016-0084401 A | 7/2016 |
| KR | 10-2016-0112186 A | 9/2016 |
| KR | 10-2017-0089217 A | 8/2017 |
| KR | 10-2018-0048109 A | 5/2018 |
| WO | WO 2015/069614 A1 | 5/2015 |

OTHER PUBLICATIONS

Panda, P., & Roy, K. (Jul. 2016). Unsupervised regenerative learning of hierarchical features in spiking deep networks for object recognition. In 2016 International Joint Conference on Neural Networks (IJCNN) (pp. 299-306). IEEE. (Year: 2016).*

(Continued)

*Primary Examiner* — Alan Chen
(74) *Attorney, Agent, or Firm* — NSIP Law

(57) ABSTRACT

Embodiments relate to an inference method and device using a spiking neural network including parameters determined using an analog-valued neural network (ANN). The spiking neural network used in the inference method and device includes an artificial neuron that may have a negative membrane potential or have a pre-charged membrane potential. Additionally, an inference operation by the inference method and device is performed after a predetermined time from an operating time point of the spiking neural network.

16 Claims, 14 Drawing Sheets
(3 of 14 Drawing Sheet(s) Filed in Color)

(56) References Cited

OTHER PUBLICATIONS

Rueckauer, B., & Liu, S. C. (2018, May). Conversion of analog to spiking neural networks using sparse temporal coding. In 2018 IEEE international symposium on circuits and systems (ISCAS) (pp. 1-5). IEEE. (Year: 2018).*

Hunsberger, E., & Eliasmith, C. (2016). Training spiking deep networks for neuromorphic hardware. arXiv preprint arXiv:1611.05141. (Year: 2016).*

Mostafa, "Supervised Learning Based on Temporal Coding in Spiking Neural Networks", 2018, IEEE Transactions on Neural Networks and Learning Systems, vol. 29, No. 7, pp. 3227-3235. (Year: 2018).*

* cited by examiner $N^l(t)$ : Avg. firing rates in layer $l$ at time $t$
$V^l$ : Avg. CNN output values in layer $l$

INFERENCE METHOD AND DEVICE USING SPIKING NEURAL NETWORK

CROSS-REFERENCE TO RELATED APPLICATIONS

This application claims priority to Republic of Korea Patent Application No. 10-2019-0016291, filed on Feb. 12, 2019, and all the benefits accruing therefrom under 35 U.S.C. § 119, the contents of which in its entirety are herein incorporated by reference.

BACKGROUND

1. Field

The present disclosure relates to spiking neural network technology, and more particularly, to a method and device that outputs output spikes through a spiking neural network including artificial neurons that allow negative membrane potentials or are pre-charged, and infers based on output spikes after a predetermined time.

2. Description of the Related Art

To solve complex or potential deleterious problems, various studies have been made to implement the human way of thinking in computing devices. One of them is neural network technology that models operations of biological nerve cells of human to implement them in hardware. The neural network technology is close to the human learning ability by modeling using a neural network based learning model that mathematically represents the neurotransmission process of synapses. The neural network may perform mapping between inputs and outputs through learning.

Currently, a neural network with high performance widely used in the artificial intelligence related industry is an analog-valued neural network (ANN) that outputs consecutive values. The ANN took inspiration from real biological nervous systems, but only employs similar network structures, and has operation way(s) being different from real biological nervous systems in many aspects, such as information representation methods, and transfer function of neurons and learning methods. Specifically, the ANN uses values as input/output instead of spikes, thus information of the ANN is expressed as size of analog value. Currently, most neural networks in a technical field of the present application belong to this analog-valued neural network.

In contrast, a spiking neural network (SNN) is a neural network that is configured to operate similarly to the ways of information delivery in such human nervous systems. In addition to neuronal and synaptic state, the SNN incorporates the concept of time into the operation of its model. Specifically, the SNN represents input/output as spikes having same size, and is a neural network with operations that expresses information by rating or timing, thus the concept of time is incorporated into this network. Hence, the SNN increases in the level of realism.

Recently, there is an increasing interest in SNNs, but most of SNNs do not reach the performance of ANNs having the corresponding system structure.

SUMMARY

According to an aspect of the present disclosure, there is provided an inference method and device using a spiking neural network generated based on a pre-learned analog neural network.

An inference method using a spiking neural network, performed by a computing device including a processor, according to an aspect of the present disclosure includes inputting an input signal to the spiking neural network including a plurality of layers, outputting an output spike based on the input signal, and determining a result corresponding to the input signal based on the output spike. Here, the spiking neural network is generated based on a pre-learned ANN.

In an embodiment, the spiking neural network may be generated by forming a structure of the spiking neural network including a plurality of artificial neurons based on a structure of the pre-learned ANN including a plurality of nodes, determining parameters of the spiking neural network based on parameters of the ANN, and combining the parameters and the structure of the spiking neural network.

In an embodiment, the artificial neuron of the spiking neural network may be configured to have a negative membrane potential when a weighted sum of inputs is a negative value.

In an embodiment, the artificial neuron of the spiking neural network may be configured such that charge of the membrane potential is initiated based on a preset value before the input signal is received.

In an embodiment, the preset membrane potential value may be set based on the input signal and a threshold.

In an embodiment, the determining the result may include determining the result corresponding to the input signal after a predetermined time from an operating time point of the spiking neural network.

In an embodiment, the determining the result may be performed by filtering output spikes of the spiking neural network within the predetermined time from a time point at which the spiking neural network receives the input signal, and using output spikes after the predetermined time.

In an embodiment, the predetermined time may be set to a later time than a time point at which a ratio of an average firing rate ($N(t)$) of the spiking neural network and an average output value of the ANN corresponding to the spiking neural network is maximum.

In an embodiment, the predetermined time may be further set to an earlier time than a time point at which the spiking neural network having the artificial neuron for which the predetermined value for initiating the charge of the membrane potential is preset is at maximum performance, or a time point at which the spiking neural network having the artificial neuron for which the predetermined value for initiating the charge of the membrane potential is not preset is at maximum performance.

A computer-readable recording medium according to another aspect of the present disclosure stores computer-readable program instructions executable by a computer. Here, a processor of the computer may perform the inference method according to the above-described embodiments when the program instructions are executed by the processor.

An inference device using a spiking neural network according to still another aspect of the present disclosure may include a processor which outputs a result corresponding to input data using the spiking neural network including a plurality of artificial neurons, for inference, and a memory which stores instructions executable by the processor.

In an embodiment, the artificial neuron of the spiking neural network may be configured to have a negative membrane potential when a weighted sum of inputs is a negative value.

In an embodiment, the artificial neuron of the spiking neural network may be configured such that charge of the membrane potential is initiated based on a preset value before the input data is received.

In an embodiment, the processor may be further configured to perform an inference operation after a predetermined time from an operating time point of the spiking neural network.

According to an aspect of the present disclosure, with the spiking neural network, it is possible to perform an inference operation (or cognition operation) for outputting a result corresponding to input data (or input signal). The spiking neural network is generated by determining the parameters of the spiking neural network based on parameters of the ANN pre-learned through a variety of high performance learning technologies (for example, back propagation) for ANNs already introduced.

Here, the artificial neurons of the spiking neural network used in the inference operation may be configured to have negative membrane potentials. As a result, an information loss does not occur.

Additionally, the artificial neurons of the spiking neural network may be configured to be pre-charged to a predetermined membrane potential value, so they have an improved signal processing rate. Accordingly, the spiking neural network including the artificial neurons exhibits high inference performance (or cognition performance).

Further, in performing the inference operation (or cognition operation), among output spikes outputted from the network, output spikes after a predetermined time may be used. As a result, it is possible to reduce errors caused by overshoot occurring due to the internal delays or pre-charges, thereby improving the inference accuracy and the signal processing rate.

The effects of the present disclosure are not limited to the above-mentioned effects, and other effects not mentioned herein will be clearly understood by those skilled in the art from the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

To explain the technical solution of the embodiments of the present disclosure or the related art more clearly, a brief introduction to necessary drawings in the description of the embodiments is provided below. It should be understood that the accompanying drawings are provided for illustration purposes only, but not intended to limit the embodiments of the present disclosure. Additionally, for clarity of description, the accompanying drawings may show certain elements with various modifications such as exaggeration and omission.

DETAILED DESCRIPTION

The terminology used herein is for the purpose of describing particular embodiments only and is not intended to be limiting of the present disclosure. As used herein, the singular forms are intended to include the plural forms as well, unless the context clearly indicates otherwise. It will be understood that the terms "comprising" or "including" when used in this specification, specify the presence of stated features, regions, integers, steps, operations, elements, and/or components, but do not preclude the presence or addition of one or more other features, regions, integers, steps, operations, elements and/or components.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the present disclosure will be described in detail with reference to the accompanying drawings.

Figure 1:
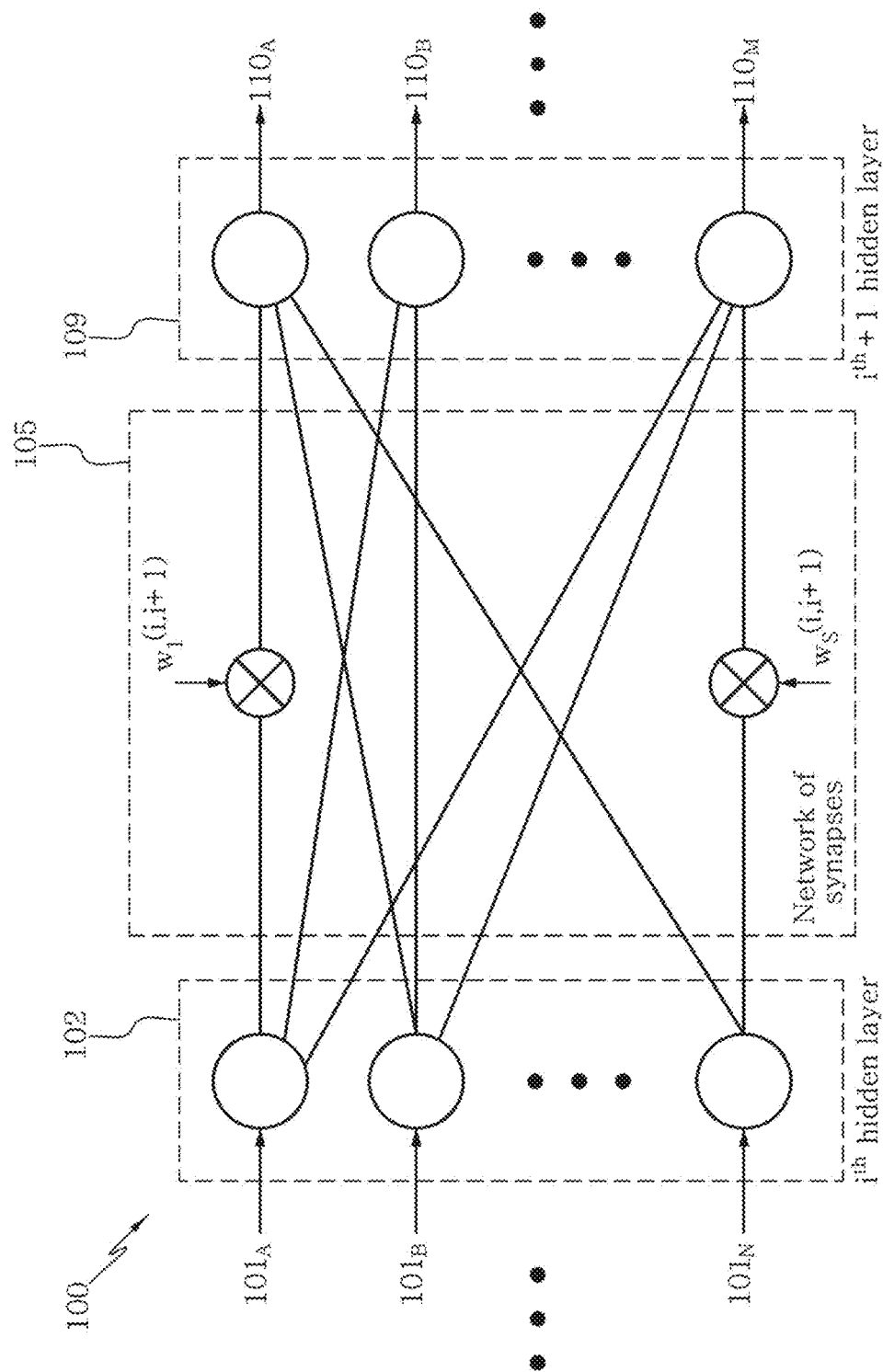
FIG. 1 is a diagram illustrating the structure of a spiking neural network according to an embodiment of the present disclosure.

FIG. 1 is a diagram illustrating the structure of a spiking neural network (SNN) 100 according to an embodiment of the present disclosure.

In biological neurons, an output spike generated when a neuron fires is referred to as an action potential. The output spike is represented as an electrical signal, and is a transient and all or nothing impulse signal having an amplitude of roughly 100 mV and a duration of about 1 ms. In a neural network having a series of connected neurons, every action potential has basically the same amplitude and duration. Accordingly, information in the signal is represented by the frequency of spikes, the number of spikes, the duration of the spike, the time interval between spikes, and their combination. The information carried by the action potential is based on the spike, the neuron that spiked, and the time of the spike relative to one or more other spikes.

SNNs are configured to perform operations with ways which are very similar to biological neurons on hardware.

Referring to FIG. 1, the spiking neural network 100 includes a plurality of hidden layers, and each hidden layer includes a plurality of artificial neurons. Each layer is connected through a synapse to form a neural network.

For example, as shown in FIG. 1, the spiking neural network 100 may include a hidden layer 102 and a hidden layer 109 including a plurality of artificial neurons. The hidden layer 102 is connected to the hidden layer 109 through a network 105 of synapses. However, this structure is for illustration only, and the spiking neural network 100 may include more than two hidden layers, or a single hidden layer.

In certain embodiments, some of the artificial neurons may be connected to other artificial neurons of the same layer through lateral connections. Additionally, some of the artificial neurons may be connected to an artificial neuron of the previous hidden layer through feedback connections.

The spiking neural network 100 includes artificial neurons configured to fire and output a spike when a membrane potential reaches a predetermined threshold. Here, the membrane potential of the artificial neuron is a value indicating the state of the artificial neuron, and in an embodiment, may be the intensity (for example, a potential value) of an electrical signal of the artificial neuron when the output signal of the artificial neuron is the electrical signal (for example, current).

Each artificial neuron of the hidden layer 102 may receive a signal 101 that may be generated by an input of the previous hidden layer (not shown) as an input signal. In an embodiment, the signal 101 may indicate the input (for example, input current) of the hidden layer 102. The inputs for the artificial neuron of the hidden layer 102 charge the membrane potential of the corresponding artificial neuron. When the membrane potential reaches its threshold, the artificial neuron fires a spike to be transferred to a subsequent hidden layer (for example, the hidden layer 109) including artificial neurons.

The transfer of spikes from the previous hidden layer to the subsequent hidden layer is achieved through a network of synaptic connections (or "synapse network") 105 as shown in FIG. 1. The synapse network 105 receives spikes from pre-synaptic neurons relative to the synapse network 105, i.e., the artificial neurons of the hidden layer 102.

In an embodiment, the synapse network 105 may apply at least one weight. For example, the input signals of the synapse network 105 may be scaled according to the adjustable weights $w_1, \ldots, w_s$ (where s is the number of synaptic connections between the hidden layers 102, 109). The weights $w_1, \ldots, w_s$ of the spiking neural network 100 may become negative values.

In another embodiment, the synapse network 105 may not be configured to apply the weights at least in part.

The signals in the synapse network 105 may be combined as each input signal for the artificial neurons included in the hidden layer 109. The hidden layer 109 may generate and output a spike 110 based on the combined input signals corresponding to every artificial neuron of the hidden layer 109. The output spike 110 of the hidden layer 109 may be transferred to another layer (for example, another hidden layer (not shown) or another output layer (not shown)) through another synapse network (not shown).

As described above, in addition to neuronal and synaptic state, the spiking neural network 100 is a neural network that incorporates the concept of time into its operation model.

According to the present disclosure, a predetermined function of the network may be performed using the spiking neural network 100.

In an embodiment, the spiking neural network 100 is generated based on a pre-learned ANN. For example, the structure and parameters of the spiking neural network 100 may rely on the ANN. A process of generating the spiking neural network 100 is described in more detail with reference to FIG. 6 below.

Figure 2:
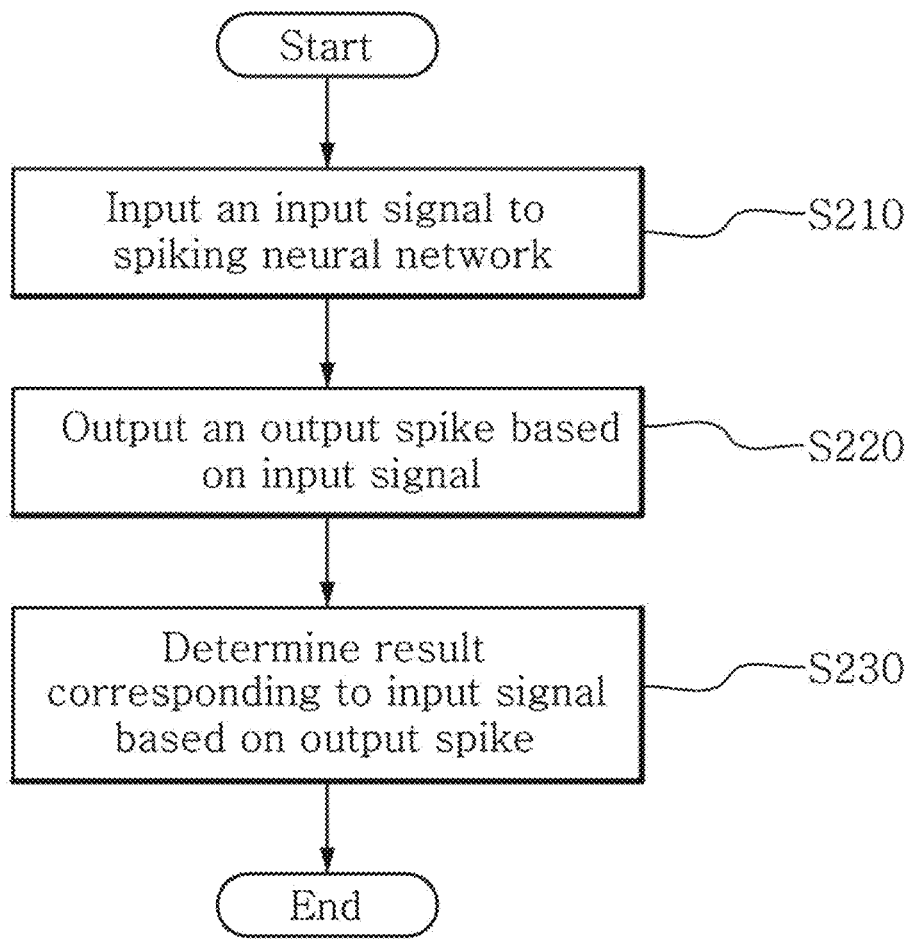
FIG. 2 is a flowchart of an inference method using a spiking neural network according to an embodiment of the present disclosure.

FIG. 2 is a flowchart of an inference method using the spiking neural network 100 according to an embodiment of the present disclosure.

The function of the spiking neural network 100 is determined based on function of the pre-learned ANN. For example, when the ANN for the spiking neural network 100 is trained to have an inference function of outputting a result corresponding to input data based on training data, the function of the spiking neural network is determined as the inference function.

Hereinafter, for clarity of description, the description of the present disclosure is made by referring to the function of the spiking neural network 100 as the inference function. However, when the function of the ANN for the spiking neural network 100 is a function other than inference, it will be obvious to those skilled in the art that the function of the spiking neural network 100 is not limited to the inference function.

Referring to FIG. 2, a method for performing the function of the network (i.e., an inference method) includes inputting an input signal to the spiking neural network including a plurality of layers (S210), and outputting an output spike based on the input signal (S220). Additionally, in certain embodiments, the method may further include determining a result corresponding to the input signal based on the output spike (S230).

The spiking neural network 100 is further configured to reduce or minimize an information loss in the process of transfer between layers, achieve more rapid system operation and improve the network performance.

Figure 3:
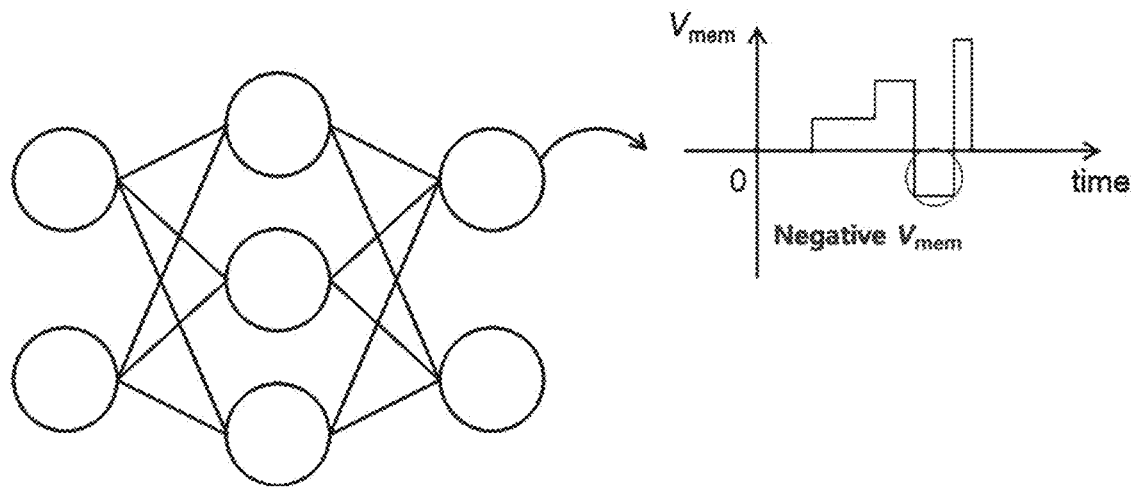
FIG. 3 is a diagram illustrating an artificial neuron that may have a negative membrane potential according to an embodiment of the present disclosure.

FIG. 3 is a diagram illustrating an artificial neuron that may have a negative membrane potential according to an embodiment of the present disclosure.

Referring to FIG. 3, the artificial neuron of the spiking neural network 100 is allowed to have a negative membrane potential. Accordingly, when the artificial neuron of the spiking neural network 100 of the present disclosure receives an input connected to a negative weight, the membrane potential of the artificial neuron may have a negative value while these inputs are accumulated.

Under the premise that activity of the ANN is equal to activity of the spiking neural network, the spiking neural network may be built using the ANN. In the Rectified Linear Unit (ReLU) function of the ANN, when the weighted sum is a negative value, the output value is 0. Accordingly, due to this feature, the existing ANN limits the acceptable lower limit value of the membrane potential to 0 when simulating the output activity of the artificial neuron (for example, integrate-fire neuron).

However, in the spiking neural network 100, information is represented according to the frequency, number, and time interval of spikes distributed discretely over time, and these are inputted and summated to the membrane potential.

Assume that the lower limit value of the membrane potential in the spiking neural network 100 is limited to 0. Then, when the weighted sum of inputs becomes a negative value due to the dominant effect of inputs connected to negative weights among inputs entering every time, the total number of signals accumulated over the entire duration of the operation (for example, inference operation) of the network is unequal to the ReLU function of the ANN. That is, positive accumulation further occurs in the network exactly equally as much as an amount that did not go down to the membrane potential of less than 0 instantaneously every time, and this difference acts as an error that causes overfiring of output of the artificial neuron. The error occurs more severely in deep neural networks having many hidden layers. In detail, the error caused by limiting the lower limit value of the membrane potential to 0 is added to a signal that is generated by overfire in the previous layer and inputted to the subsequent layer, and eventually, the firing rate at the final output shows a great difference from the output characteristics of the ReLU function of the ANN.

In contrast, as shown in FIG. 3, because the artificial neuron of the spiking neural network 100 is allowed to have a negative membrane potential, even though the weighted sum of received inputs has a negative value, the artificial neuron may have a negative membrane potential. If the artificial neuron may have a sufficient negative membrane potential, an information loss and system performance degradation of the network 100 is minimized.

In certain embodiments, the negative membrane potential may be allowed for all artificial neurons of the spiking neural network 100.

In addition, the spiking neural network 100 may be further configured to have other features for performance improvement in aspect of network structure.

Figure 4:
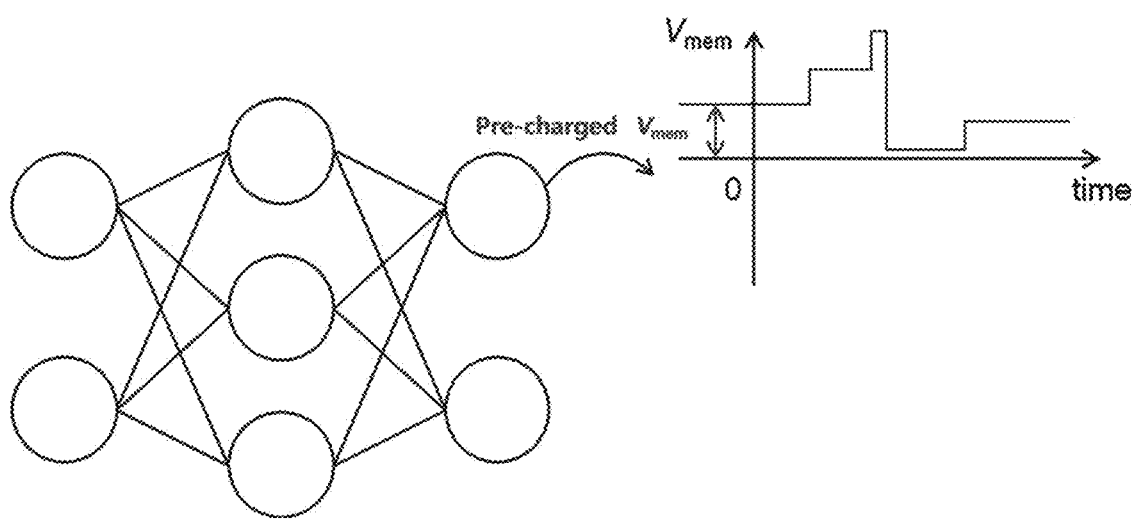
FIG. 4 is a diagram illustrating an artificial neuron having a membrane potential pre-charged to a predetermined value according to an embodiment of the present disclosure.

FIG. 4 is a diagram illustrating an artificial neuron having a membrane potential pre-charged to a predetermined value according to an embodiment of the present disclosure.

According to the structural characteristics of the deep spiking neural network 100, unless an output signal (for example, a spike) is outputted from a previous layer (for example, the hidden layer 102) at a proper time, an output signal 110 cannot be obtained in a next layer (for example, the hidden layer 109) at a proper time. As described above, the output spike of the spiking neural network 100 is outputted when the membrane potential by the input signal reaches its threshold. Accordingly, the existing spiking neural network requires a predetermined time to output an output spike, and eventually, a considerable amount of time is required to obtain the maximum performance of the network. When the spiking neural network performs an operation, for example, inference, before obtaining the maximum performance, low performance is exhibited. In the end, the system using the existing spiking neural network has a long operating time. Generally, the considerable amount of time is called an internal delay.

In contrast, referring to FIG. 4, the artificial neuron of the spiking neural network 100 is set to have a predetermined membrane potential before receiving an initial input signal. That is, the artificial neuron has a pre-charged membrane potential (pre-charged $V_{mem}$).

When the artificial neuron of the spiking neural network 100 has the pre-charged membrane potential, a change in membrane potential of the artificial neuron by the input signal is initiated based on the pre-charged membrane potential. Accordingly, the membrane potential state of the artificial neuron may quickly reach the threshold that fires the output spike as much as a predetermined potential value corresponding to the pre-charged membrane potential.

As a result, in the artificial neuron of which the membrane potential is pre-charged to the predetermined value, it takes a shorter time to generate an initial output spike than the artificial neuron of which the membrane potential is not pre-charged.

The pre-charged membrane potential only makes earlier advance the output occurrence time point of the initial spike. The accumulation by the next input signal starts from the time set by a process of resetting the membrane potential of the neuron, and thus, serves to reduce the internal delay and does not cause the entire network performance degradation.

In an embodiment, the artificial neuron of the spiking neural network 100 may be configured to initiate the charge of the membrane potential by the input signal based on a preset value before receiving the initial input signal.

Here, the predetermined value (i.e., the pre-charged membrane potential) is set based on the input signal and the threshold. For example, when a specific input signal is inputted to the spiking neural network 100 including an artificial neuron without pre-charge, when the membrane potential of the previous layer (for example, the hidden layer 102)) does not reach the threshold and the previous output spike is not outputted, an output spike of the subsequent layer (for example, the hidden layer 109) is not generated. In contrast, the specific input signal is inputted to the pre-charged spiking neural network 100, the previous output spike is outputted and an output spike of the subsequent layer (for example, the hidden layer 109) can be generated. Accordingly, even when an input signal that cannot generate an output spike is inputted before a predetermined membrane potential value is charged, the artificial neuron of the spiking neural network 100 of FIG. 4 may output an output spike.

The predetermined value is set based on the structure of the neural network and the input signal being inputted.

In certain embodiments, all artificial neurons of the spiking neural network 100 may be set such that a predetermined membrane potential value is pre-charged.

As described above, the spiking neural network 100 of the present disclosure can greatly reduce the internal delay by pre-charging the membrane potential of the artificial neuron. Accordingly, when the network function (for example, inference or cognition) is performed through the spiking neural network 100 having the above-described features, the improved system performance can be obtained.

In addition, the method for performing the network function (i.e., the inference method) using the spiking neural network 100 of the present disclosure can improve the system performance in aspects of network structure as well as network function execution.

Referring back to FIG. 2, when the spiking neural network 100 having at least one of the structural features described above receives an input signal at S210, an output spike is outputted by transfer of spikes between layers in the spiking neural network 100 (S220), and a result corresponding to the input signal is determined using the output spike of the spiking neural network 100 (S230).

A general inference process using a spiking neural network starts an inference operation at the same time as the time when the network receives an input signal. That is, all output spikes outputted from the network are used in the inference operation. However, according to an embodiment of the present disclosure, the inference operation is performed after a predetermined time from the time point at which the network receives an input signal.

Figure 5:
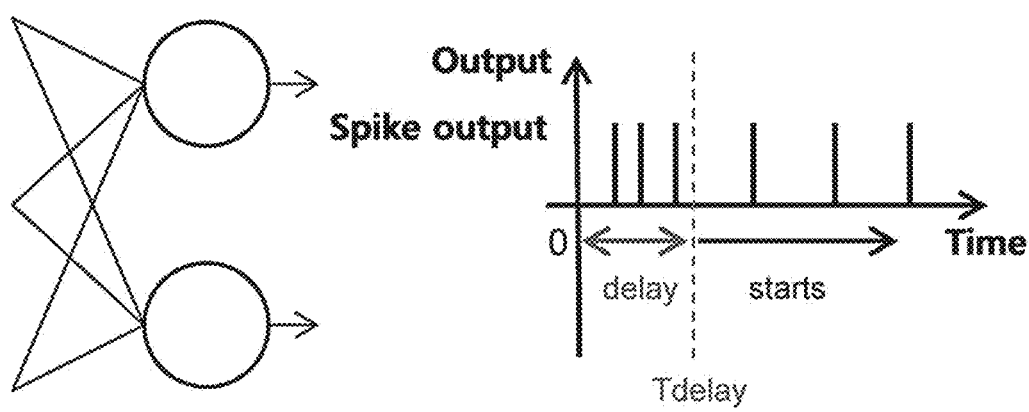
FIG. 5 is a diagram illustrating a delayed inference operation according to an embodiment of the present disclosure.

FIG. 5 is a diagram illustrating a delayed inference operation according to an embodiment of the present disclosure.

Referring to FIG. 5, in the inference method using the spiking neural network 100 according to an embodiment of the present disclosure, a specific operation (for example, an inference operation) for the function of the network is performed after a predetermined time from the time point at which the network 100 starts the operation. That is, outputs outputted before the predetermined time are ignored, and the function of the network is only performed with spikes after the predetermined time. Here, the operating time point of the spiking neural network 100 indicates the time point at which the network 100 receives an input signal or the zero timestep start time.

As such, the inference operation of the network 100 is substantially performed after the predetermined time from the time point of input, so the operation aspect of the network 100 may be represented by a delay.

In the case of the spiking neural network composed of integrate-fire neurons of pre-charged membrane potential, a considerable error may occur at an initial time point at which an output spike is generated in the output layer. The error is commonly referred to as overshoot.

However, the influence of the error reduces over time, and without pre-charge, the error is further reduced after the threshold is reached. That is, error information is concentrated for an initial period from the time point at which an output spike of the spiking neural network is initially outputted.

Accordingly, as shown in FIG. 5, when output spikes outputted from the network 100 after a predetermined time from the operating time point of the spiking neural network 100 are used, the influence of overshoot reduces, leading to higher performance in performing the function of the network 100 using the result (i.e., information) of the spiking neural network 100.

To this end, in an embodiment, in S230, the spiking neural network 100 filters output spikes of the network 100 for a predetermined time from the operating time point of the network 100, and performs a delayed inference operation based on output spikes after the predetermined time, thereby minimizing the influence of errors resulting from the properties of the spiking neural network and obtaining high performance quickly.

The predetermined time is set based on the result of the spiking neural network 100 and the result of the ANN corresponding to the spiking neural network 100. Here, the corresponding ANN refers to the ANN used in the modeling of the spiking neural network 100.

Additionally, the predetermined time may be set to a proper value in aspects of performance improvement of the network 100 and the processing rate of the network 100 based on the internal delay and overfire.

In an embodiment, the delay at which the delayed inference operation starts is set to a later time than the time point at which a ratio of average firing rate N(t) of the spiking neural network 100 and average output value V of the corresponding ANN is maximum.

In certain embodiments, the delay may be set based on the average firing rate $N^{l.o}(t)$ of the output layer l.o of the spiking neural network 100 and the average output value of the corresponding ANN.

Additionally, the delay is set to an earlier time than the time point at which the performance of the spiking neural network 100 is maximum where the delayed inference operation is not performed. For example, the delay is set to an earlier time than the time point at which the performance of the spiking neural network 100 without pre-charge is maximum or the performance of the spiking neural network 100 with pre-charge is maximum. It is because a lower processing rate than the existing spiking neural network is obtained when the delay is set to a later time than the time point at which the performance of the spiking neural network 100 is maximum where the delayed inference operation is not performed. In certain embodiments, the delay may be set to an earlier time than a time point (first time point) at which the spiking neural network having an artificial neuron for which a predetermined value for initiating the membrane potential charge is preset is at maximum performance or a time point (second time point) at which the spiking neural network having an artificial neuron for which a predetermined value for initiating the membrane potential charge is not preset is at maximum performance. For example, the delay may be set to an earlier one of the first time point and the second time point.

When the operation of the network 100 is performed based on the delay, the time required to reach the maximum performance of the network 100 reduces.

For example, in case that all output spikes after the operation of the spiking neural network 100 are used, in a first time (for example, 180 timesteps) taken to reach the maximum performance of the network 100, when output spikes after a predetermined time (for example, 30 timesteps) from the operating time point of the spiking neural network 100 are used, a second time (for example, 50 timesteps) may be required after the predetermined time. In this case, the sum (i.e., 80 timesteps) of the second time and the predetermined time is less than the first time. That is, even though the delay is considered, the time taken for the network 100 to show the highest performance may be significantly reduced.

In another embodiment, the delayed inference operation may be used to evaluate the performance of the network. For example, to evaluate the performance of the network, output spikes after the delay may be used.

As such, according to embodiments of the present disclosure, it is possible to provide the spiking neural network 100 with no information loss, reduced internal delay, and remarkable ability to infer.

The generation of the spiking neural network 100 according to embodiments of the present disclosure may be performed using the ANN.

The ANN is a deep neural network including a plurality of hidden layers, and may include, for example, a convolutional neural network (CNN).

Figure 6:
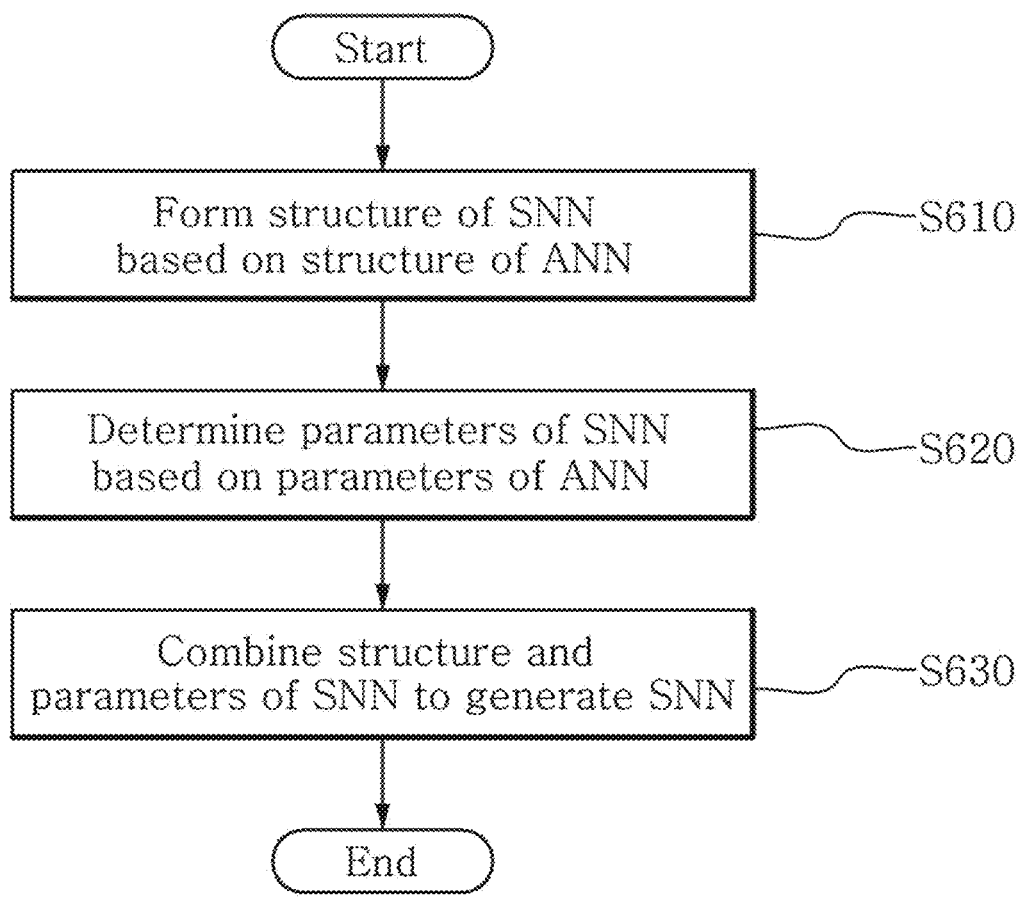
FIG. 6 is a flowchart of a method for generating a spiking neural network according to an embodiment of the present disclosure.

FIG. 6 is a flowchart of a method for generating a spiking neural network according to an embodiment of the present disclosure.

Referring to FIG. 6, the method for generating a spiking neural network according to an embodiment of the present disclosure includes forming a structure of a spiking neural network including a plurality of artificial neurons based on a structure of a pre-learned ANN including a plurality of nodes (S610), determining parameters of the spiking neural network based on parameters of the ANN (S620), and combining the parameters and structure of the spiking neural network to generate the spiking neural network (S630).

In S610, in an embodiment, the structure of the spiking neural network 100 may be formed by one-to-one correspondence between the artificial neuron of the spiking neural network 100 and the node of the ANN. Accordingly, the layer of the spiking neural network 100 may be configured to have one-to-one correspondence with the layer of the ANN.

S610 includes forming an artificial neuron that may have a negative membrane potential. In an embodiment, the artificial neuron of the spiking neural network 100 may be configured to have a negative membrane potential when receiving a signal connected to a negative weight.

Additionally, in an embodiment, the artificial neuron of the spiking neural network 100 may be a pre-charged artificial neuron configured such that a predetermined value is pre-charged. The predetermined value may be set and charged after the following step S630.

S620 includes determining parameters of the spiking neural network based on the parameters of the pre-learned ANN. For example, weights of the spiking neural network 100 may be determined by normalizing the parameters of the ANN.

The ANN may include a plurality of layers, and each layer may include a plurality of units. The units of the neighboring layers may be connected with synapses. According to various learning methods of the ANN, the synapses in the ANN may be given weights, and the parameters of the ANN may include these weights. Additionally, the parameters of the ANN may further include a bias applied to the plurality of units.

In an embodiment, in the parameters of the pre-learned ANN, the weights of the pre-learned ANN are normalized based on a larger one of the maximum activation value and the maximum positive weight for nodes included in each layer of the ANN, and the weights of the spiking neural network 100 are determined based on the normalized weights.

When the spiking neural network 100 operates for discrete timesteps, the firing rate of the artificial neuron may be limited by the inverse time resolution. Because the ANN does not have such a limitation, saturation occurs when the parameters of the ANN are applied to the spiking neural network 100 as they are. Accordingly, the parameters (for example, weights) of the ANN are normalized to prevent saturation.

In certain embodiments, normalization processing may be performed based on a larger one of the maximum activation value and the maximum positive weight, for all nodes in each layer from the input layer of the network to the output layer in the ANN.

The normalized maximum activation value is further determined to have a value that is equal to or less than 1 to prevent the saturation of the output characteristics. Additionally, the normalized weight is further determined to have a value that is equal to or less than 1 to prevent one weight from inducing too much activation.

Additionally, the parameters of the ANN may further include a bias related to activation. The normalization of the bias is similar to the above-described normalization of the weight, and its detailed description is omitted herein.

In an embodiment, when the ANN includes an average pooling layer, for the average pooling layer of the spiking neural network 100, the average pooling layer of the spiking neural network 100 has 1/(the number of weights connected from the artificial neuron of the previous layer) as a basic weight, and normalization processing may be performed to further determine the basic weight of the average pooling layer to prevent a signal after average pooling from causing saturation due to the output characteristics of the artificial neuron of the subsequent layer.

The above-described process of determining the parameters of the spiking neural network 100 is for illustration purposes only, and the present disclosure is not limited thereto, and it will be obvious to those skilled in the art that other processes may be variously performed, further considering the purpose and structure of the spiking neural network 100.

The spiking neural network 100 may be implemented (for example, emulated) in software or hardware. In an embodiment, the spiking neural network 100 may be emulated or implemented by a computing device including a processor and/or memory. In detail, when the processor works, the computing device may include a memory to store program instructions causing the processor to perform the method for generating the spiking neural network 100 and/or the inference method using the spiking neural network 100.

In another embodiment, the spiking neural network 100 may be emulated by an electric circuit. For example, each artificial neuron in the spiking neural network 100 is implemented as a neural circuit, and charging the neuron membrane potential to the threshold initiating the output spike may be implemented, for example, as a capacitor that incorporates the flowing currents.

The spiking neural network 100 according to embodiments of the present disclosure can be simply applied to not only classification functions, but also all applications (for example, regression and Generative Adversarial Network (GAN)) using neural networks, such as inference and cognition.

In an embodiment, the inference device using the spiking neural network 100 includes a processor to output a result corresponding to input data using the spiking neural network 100 according to the above-described embodiments, and a memory to store instructions executable by the processor.

First Experimental Example

The ANN used in the first experimental example for evaluating the performance of the spiking neural network 100 of the present disclosure is a CNN, and the structure of the ANN has a structure including 9 hidden layers and a pooling layer, 96c3(1)-96c3(1)-96c3(2)-192c3(1)-192c3(1)-192c3(2)-192c3(1)-192c1(1)-10c1(1)—Global Average Pooling (GAP), and training and test data and input data is Google's CIFAR10 dataset. Here, the hidden layer represented as 96c3 includes 96 output channels and 3×3 filter. The activation function ReLU is applied to the output of each hidden layer.

In the above experimental example, the spiking neural network 100 also includes 9 hidden layers, and parameters of the spiking neural network 100 are determined based on the parameters of the ANN learned using CIFAR10.

Figure 7A:
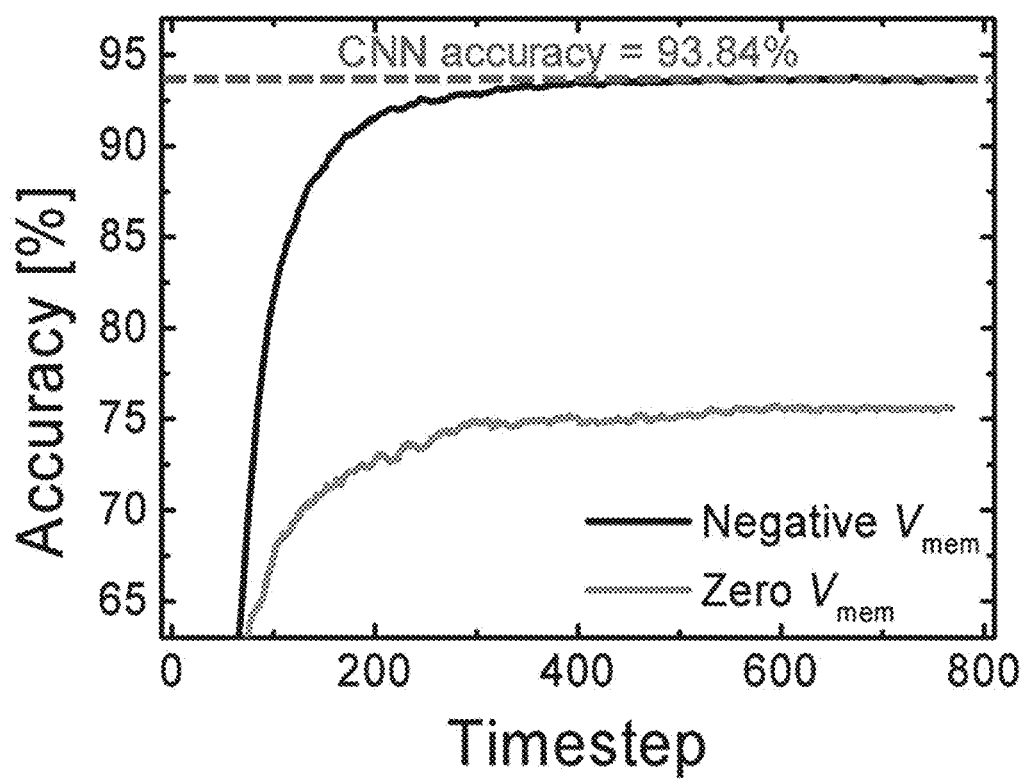
FIGS. 7A to 7C are diagrams illustrating network performance improvement by a negative membrane potential allowed according to a first experimental example of the present disclosure.
Figure 7B:
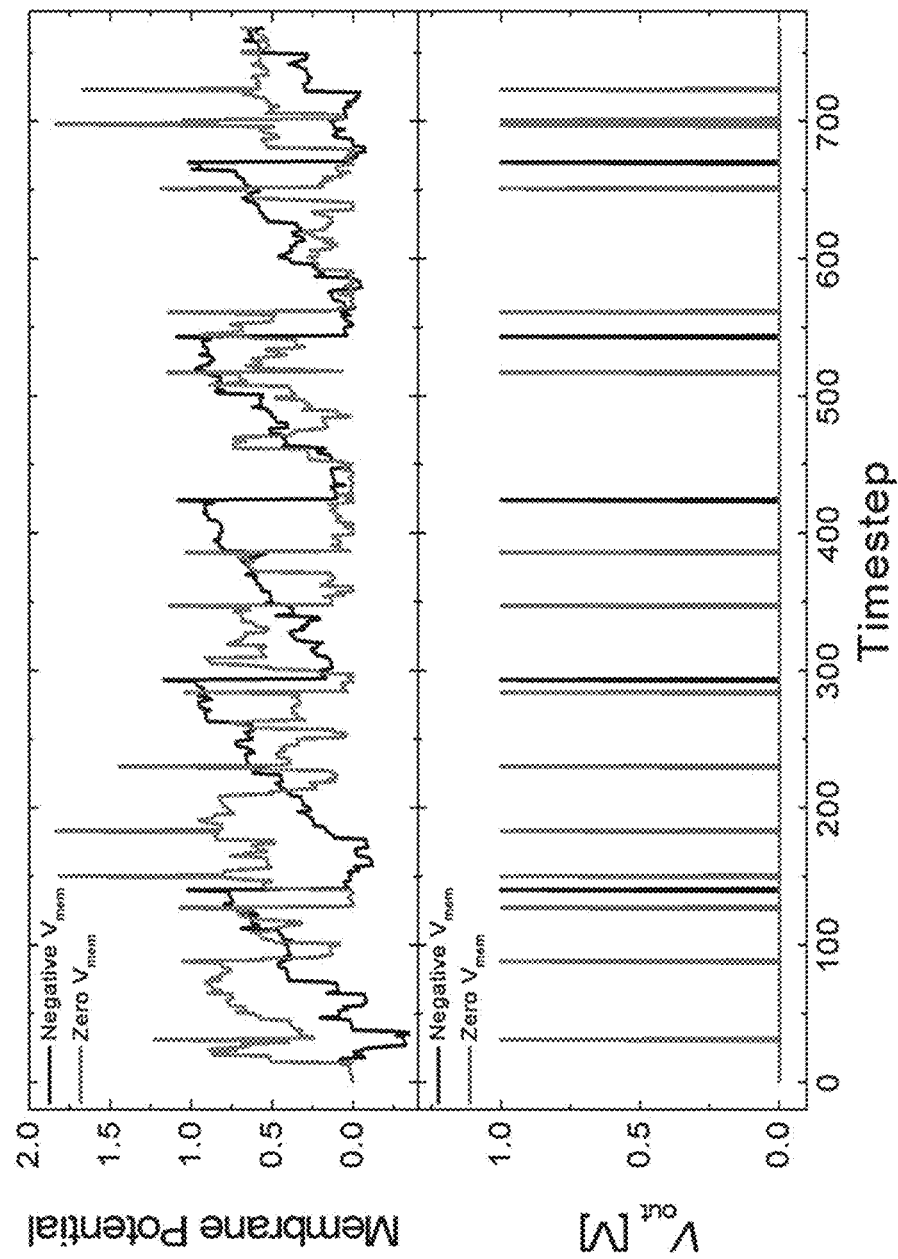
Figure 7C:
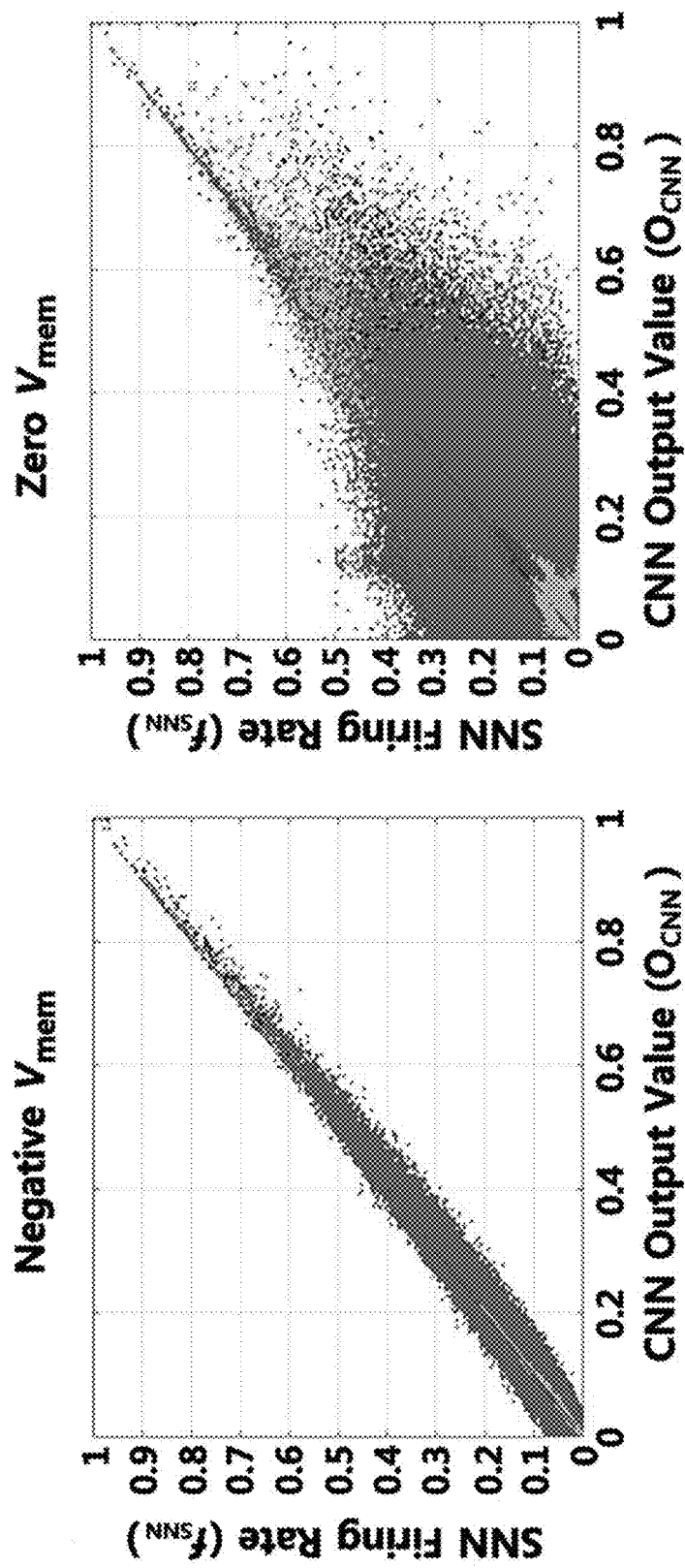

FIGS. 7A to 7C are diagrams illustrating network performance improvement by a negative membrane potential allowed according to a first experimental example of the present disclosure.

FIG. 7A shows the performance of the ANN, and the performance of the spiking neural network with and without negative membrane potential. As shown in FIG. 7A, the performance of the ANN learned using CIFAR10 shows classification accuracy of 93.84%. On the other hand, the spiking neural network 100 with negative membrane potential has higher performance in a shorter time than the spiking neural network 100 without negative membrane potential. Particularly, it can be seen that when a negative membrane potential is allowed, there is no information loss for each time, and thus, the performance is closer to the performance of the ANN over time. In contrast, when a negative membrane potential is disallowed, the performance is low due to an information loss, and even after a sufficient amount of time passes, a result of less than 90% is shown.

FIG. 7B shows the membrane potential of the spiking neural network without negative membrane potential and an artificial neuron with negative membrane potential and their results.

In the same artificial neuron within the ninth layer of the spiking neural network, despite the same input signal, as shown in the upper part of FIG. 7B, in case that a negative membrane potential is disallowed, the corresponding artificial neuron cannot have a negative membrane potential, and thus, more membrane potential accumulation takes place, compared to the case in which a negative membrane potential is allowed.

As a result, as shown in the lower part of FIG. 7B, despite the same input signal, different output spikes are generated. Accordingly, when a negative membrane potential is disallowed, overshoot occurs in a different aspect from the spiking neural network 100 of FIG. 3, and eventually, accurate frequency of the output spike cannot be obtained.

FIG. 7C is a diagram showing a correlation plot of the ANN and the spiking neural network 100 for each of first to ninth hidden layers when the timestep is 600. Here, each color indicates each hidden layer. Further, a point indicates correlation between the firing rate of a hidden layer corresponding the color of the point in the spiking neural network 100 and the output value of the same hidden layer in the ANN at a certain timestep.

Because the spiking neural network 100 is generated based on the pre-learned ANN, the inference operation of the spiking neural network 100 corresponds to the inference operation of the ANN based on training data. In this aspect, the performance of the spiking neural network 100 may be evaluated based on the correlation with the inference operation of the ANN.

As shown in FIG. 7C, the case in which a negative membrane potential is allowed has a higher correlation. Based on the fact that as the correlation is higher, the performance of the spiking neural network 100 is closer to the performance of the ANN, it can be seen that when a negative membrane potential is allowed, the performance of the spiking neural network 100 is improved.

Figure 8A:
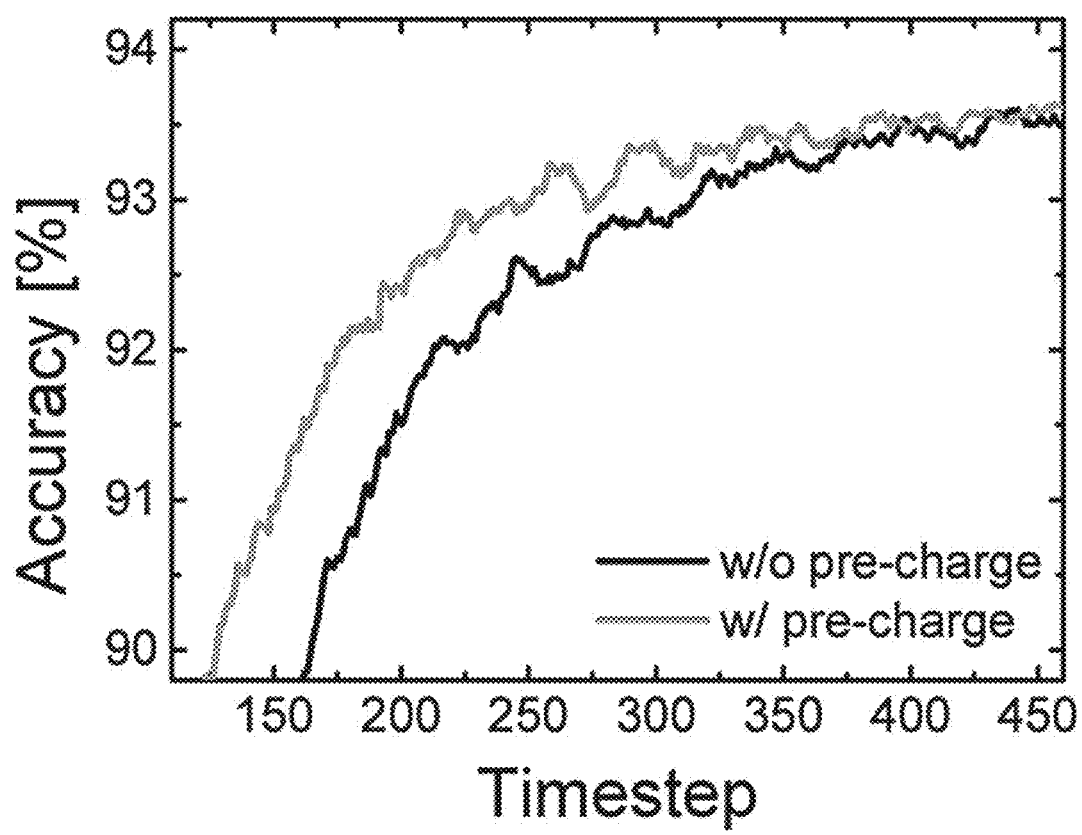
FIGS. 8A and 8B are diagrams illustrating network performance improvement by pre-charge of an artificial neuron according to a first experimental example of the present disclosure.
Figure 8B:
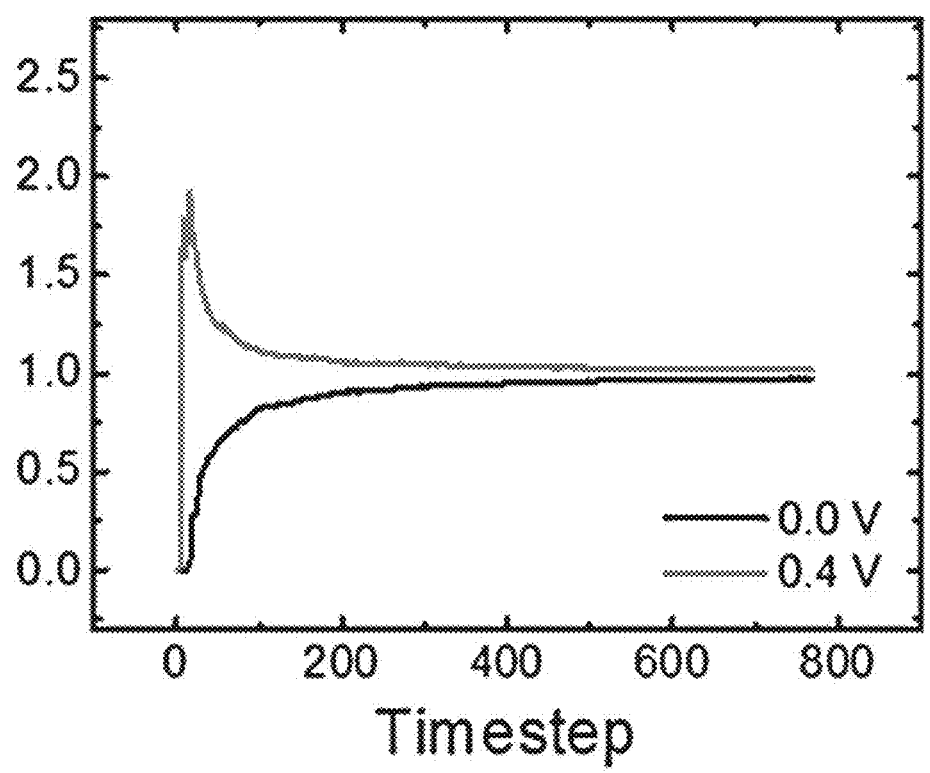

FIGS. 8A and 8B are diagrams illustrating network performance improvement by pre-charge of the artificial neuron according to the first experimental example of the present disclosure.

FIG. 8A is a diagram showing the performance of the spiking neural network 100 with and without pre-charge of a predetermined membrane potential (for example, 0.4V) value.

As shown in FIG. 8A, in the case of pre-charge of the predetermined membrane potential, the maximum performance is reached more quickly than otherwise.

FIG. 8B is a diagram showing the performance of the spiking neural network when a predetermined membrane potential in the ninth hidden layer (19) is pre-charged and is not pre-charged. As a ratio of the average firing rate N(t) of the spiking neural network 100 and the average output value of the ANN is closer to 1, the performance of the spiking neural network 100 is closer to the performance of the ANN.

As shown in FIG. 8B, overshoot caused by pre-charge occurs at the initial time of the timesteps. Subsequently, the ratio is closer to 1 over time. It can be seen that the time taken for the spiking neural network 100 with pre-charge to reach 1 via overfire is less than the spiking neural network 100 without pre-charge, so data processing and system operation speed of the spiking neural network 100 having the pre-charged artificial neuron is faster.

Figure 9:
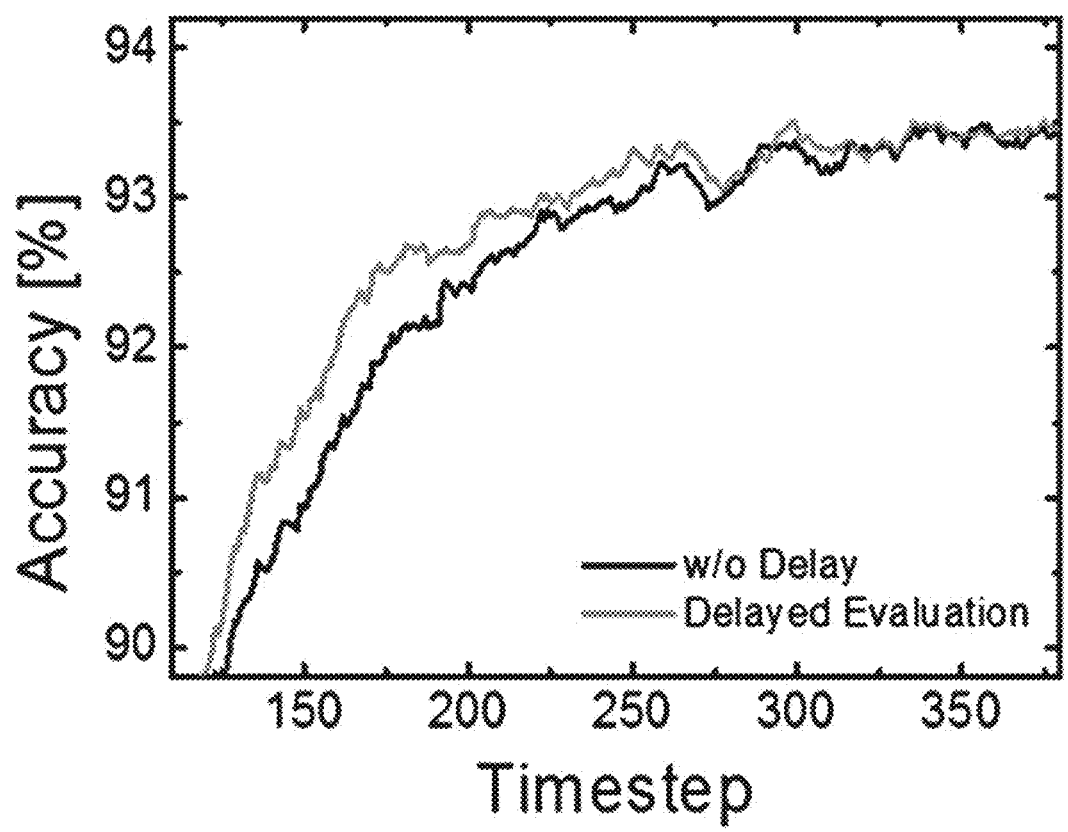
FIG. 9 is a diagram illustrating network performance improvement of a delayed inference operation according to a first experimental example of the present disclosure.

FIG. 9 is a diagram illustrating network performance improvement of delayed inference operation according to the first experimental example of the present disclosure.

Referring to FIG. 9, a scheme (i.e., a delayed inference operation) that starts information evaluation after a proper time is applied.

When determining information through the output layer (for example, the ninth hidden layer), the delayed inference operation is performed by filtering all information within a predetermined time from the time point at which the network operates (i.e., the time point corresponding to zero timestep) and determining information after the predetermined time.

As in the graph of FIG. 9, it can be seen that when starting to determine information after a predetermined time such as, for example, 50 timesteps, the cognition rate converges and reaches the maximum performance more quickly than determining information from the beginning.

Second Experimental Example

The structure of the ANN used in the second experimental example for evaluating the performance of the spiking neural network 100 of the present disclosure has a structure of 20c5(1)-50c3(1)-500FC-10FC, and training and test data is Google's MNIST dataset. Here, the layer represented as 500FC represents a fully-connected layer including 500 neurons. The activation function ReLU is applied to the output of each hidden layer.

Figure 10:
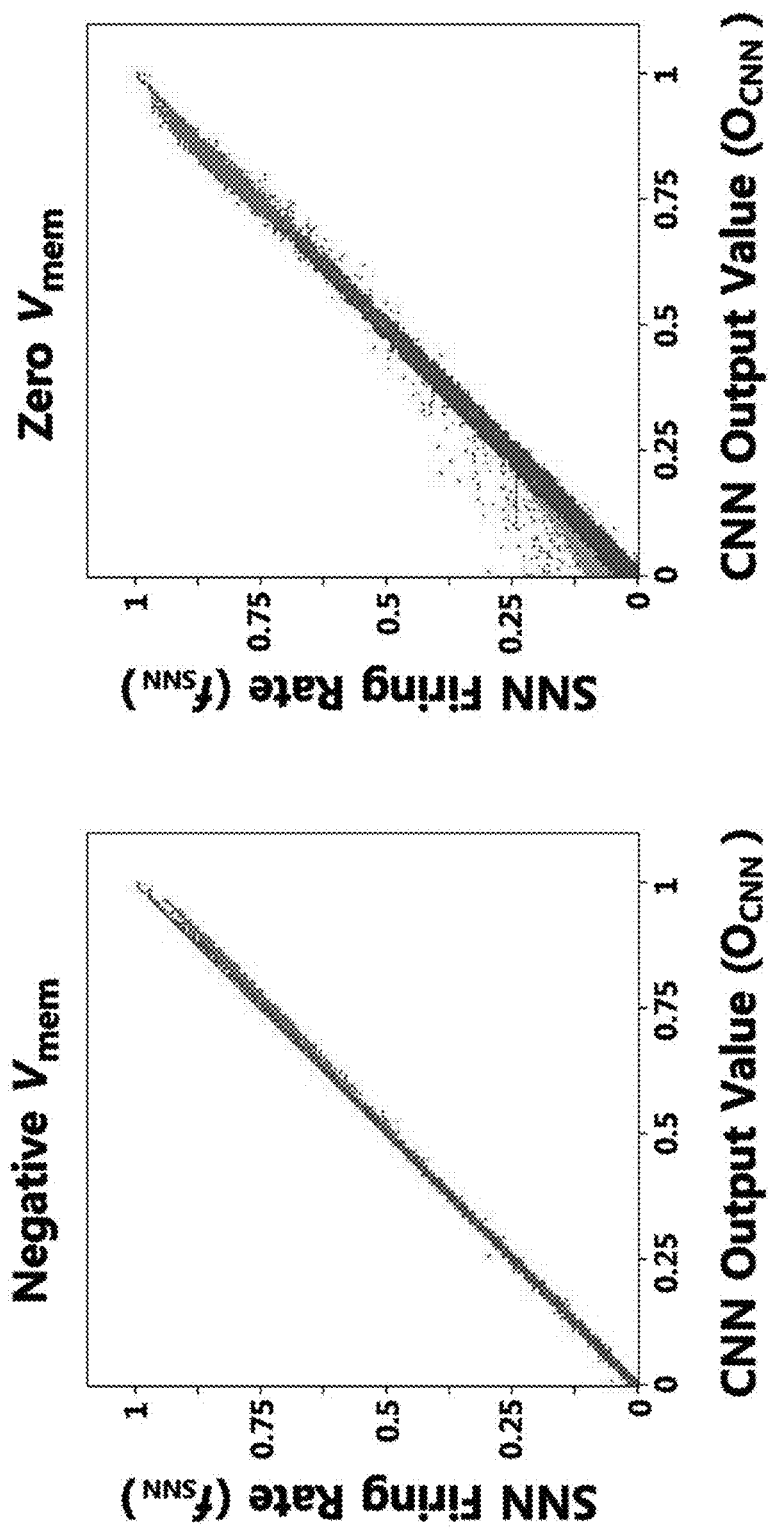
FIG. 10 is a diagram illustrating network performance improvement by a negative membrane potential allowed according to a second experimental example of the present disclosure.

FIG. 10 is a diagram illustrating network performance improvement by a negative membrane potential allowed according to the second experimental example of the present disclosure.

As the slop of the graph is closer to 1 in the correlation plot between the output of the spiking neural network 100 and the output value of the real ANN (i.e., CNN), the output of the spiking neural network 100 represents the output value of the real ANN better.

Referring to FIG. 10, similar to FIG. 7C, the spiking neural network 100 having an artificial neuron with a negative membrane potential has a higher correlation with the real ANN. In contrast, the spiking neural network 100 having an artificial neuron without a negative membrane potential has a slight deviation (thickness) in the correlation. In the end, it can be seen that the spiking neural network 100 having an artificial neuron with a negative membrane potential has higher performance.

Figure 11A:
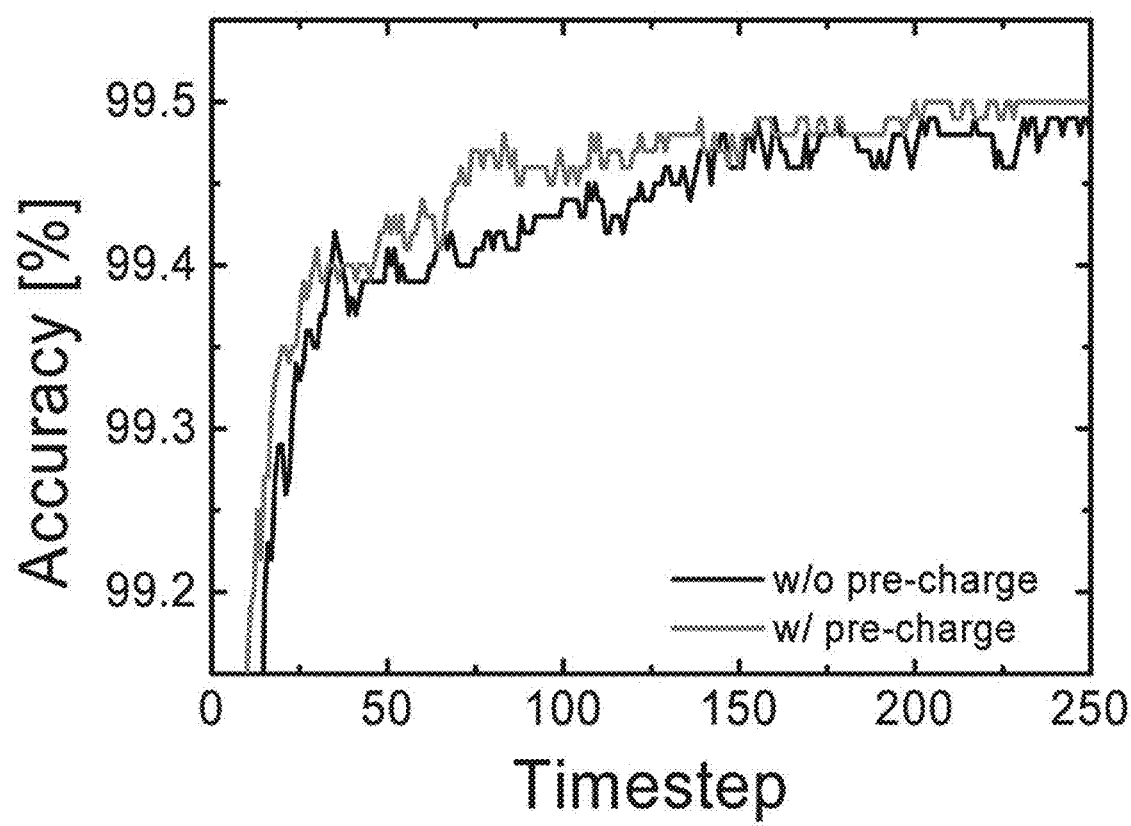
FIGS. 11A and 11B are diagrams illustrating network performance improvement of pre-charge according to a second experimental example of the present disclosure.
Figure 11B:
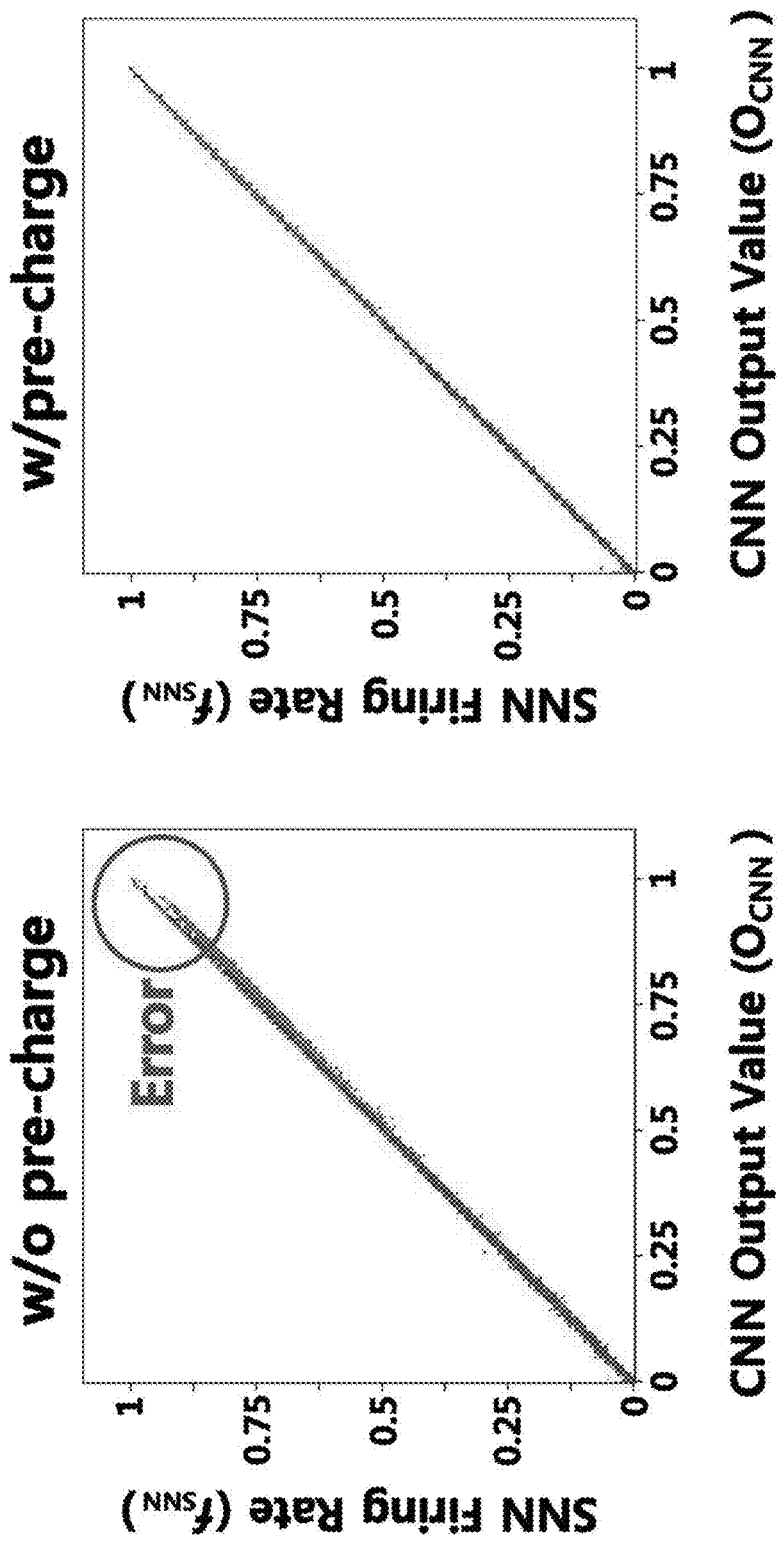

FIGS. 11A and 11B are diagrams illustrating network performance improvement of pre-charge according to the second experimental example of the present disclosure.

FIG. 11A is a diagram showing the performance of the spiking neural network 100 when a predetermined membrane potential (for example, 0.4V) value is pre-charged and is not pre-charged.

As shown in FIG. 11A, similar to FIG. 8A, in case that the predetermined membrane potential is pre-charged, the maximum performance is reached more quickly than otherwise.

Referring to FIG. 11B, the spiking neural network 100 including an artificial neuron without pre-charge has a delay (i.e., an error) that the slope is less than 1 in the regime where the output of the ANN corresponds to a large value. In contrast, it can be seen that there is no error in the spiking neural network 100 having the pre-charged artificial neuron.

The operation by the device and method according to embodiments as described above may be, at least in part, implemented in computer program and recorded in computer-readable recording media. For example, it may be implemented together with program products composed of the computer-readable media including program codes, and may be performed by the processor for performing any or all steps, operations or processes described above.

The computer-readable recording media include all types of recording devices in which computer-readable data is stored. Examples of the computer-readable recording media are ROM, RAM, CD-ROM, magnetic tape, floppy disk, and optical data storage devices. Additionally, the computer-readable recording media is distributed over computer systems connected via a network, and may store and execute the computer-readable codes in a distributed manner. Additionally, functional programs, codes and code segments for realizing this embodiment will be easily understood by persons having ordinary skill in the technical field to which this embodiment belongs.

While the present disclosure has been hereinabove described with reference to the embodiments shown in the drawings, this is provided for illustration purposes only and it will be appreciated by those having ordinary skill in the art that various modifications and variations may be made thereto. However, it should be noted that such modifications fall within the technical protection scope of the present disclosure. Therefore, the true technical protection scope of the present disclosure should be defined by the technical spirit of the appended claims.

The spiking neural network 100 according to embodiments of the present disclosure can be simply applied to not only the classification function, but also all applications (for example, regression and Generative Adversarial Network (GAN)) using neural networks, such as inference.

Spiking neural network technology has a very high possibility that it will be used as a next-generation version of an ANN used extensively in the field of machine learning that is the core technology of the fourth industrial revolution recent years. The spiking neural network 100 according to embodiments of the present disclosure ensures high performance by the introduction in all areas of industry of software and/or hardware using spiking neural networks, and it is expected that its possibilities of use and economical values will be infinite.

What is claimed is:

1. An inference method using a spiking neural network, performed by a computing device including a processor, comprising:
   inputting an input signal to the spiking neural network having a plurality of artificial neurons, the spiking neural network including a plurality of layers;
   outputting one or more output spikes based on the input signal; and
   determining a result corresponding to the input signal based on the one or more output spikes,
   wherein the spiking neural network is generated based on a pre-learned analog-valued neural network (ANN),
   wherein, with a result of a sum of respective weightings of plural inputs to an artificial neuron of the plurality of artificial neurons being negative and representing that the artificial neuron has a negative membrane potential, the determining of the result includes determining a result of the artificial neuron to be a value, which is negative, and
   wherein the determining of the result further comprises ignoring a respective output spike of the one or more output spikes that is output before a predetermined time.

2. The inference method according to claim 1, wherein the spiking neural network is generated by forming a structure of the spiking neural network including a plurality of artificial neurons based on a structure of the pre-learned ANN including a plurality of nodes, determining parameters of the spiking neural network based on parameters of the ANN, and combining the parameters and the structure of the spiking neural network.

3. The inference method according to claim 1, wherein the artificial neuron of the spiking neural network is configured such that charge of the membrane potential is initiated based on a preset value before the input signal is received.

4. The inference method according to claim 3, wherein the preset value is set based on the input signal and a threshold.

5. The inference method according to claim 4, wherein the threshold is based on a structure of the spiking neural network.

6. The inference method according to claim 1, further comprising structuring the spiking neural network based on a structure of the pre-learned ANN.

7. The inference method according to claim 6, wherein the structure of the spiking neural network comprises a one-to-one correspondence with the structure of the pre-learned ANN.

8. An inference method using a spiking neural network, performed by a computing device including a processor, comprising:
   inputting an input signal to the spiking neural network, the spiking neural network including a plurality of layers;
   outputting plural output spikes by an artificial neuron, of the spiking neural network, with respect to plural inputs to the artificial neuron, where the plural inputs are dependent on the input signal; and
   determining a result of the artificial neuron corresponding to the plural inputs based on respective first output spikes, of the plural output spikes, that are output after a predetermined time from an operating time point of the artificial neuron with respect to the plural inputs,
   wherein the spiking neural network is generated based on a pre-learned analog-valued neural network (ANN), and
   wherein the determining of the result further comprises ignoring respective second output spikes, of the output spikes, that are output before the predetermined time, where each of the respective first output spikes and the respective second output spikes may include one or more output spikes.

9. The inference method according to claim 8,
   wherein the operating time point is a time point at which the artificial neuron receives the plural inputs, and
   wherein the determining of the result of the artificial neuron comprises filtering the respective second output spikes within the predetermined time.

10. The inference method according to claim 8, wherein the predetermined time is set to a later time than a first time point to result in a ratio of an average firing rate of the spiking neural network and an average output value of the ANN corresponding to the spiking neural network approaching a value of 1.

11. The inference method according to claim 8, wherein the predetermined time is further set to an earlier time than a second time point to result in a ratio of an average firing rate of the spiking neural network and an average output value of the ANN corresponding to the spiking neural network approaching a value of 1.

12. The inference method according to claim 8, wherein output spikes generated during the predetermined time are discarded.

13. The inference method according to claim 8, wherein the predetermined time is a time period based on an average firing rate of an output layer and an average output value of the pre-learned ANN.

14. An inference device using a spiking neural network, comprising:
   a processor which outputs a determined result corresponding to input data using the spiking neural network including a plurality of artificial neurons, for inference; and
   a memory which stores instructions executable by the processor, wherein execution of the instructions by the processor configures the processor to:
      perform the determination of the result corresponding to the input data, based on respective first output spikes of plural output spikes from the artificial neuron, that are output after a predetermined time from an operating time point of the artificial neuron with respect to the plural inputs, the determination further comprising:
         determining, with a sum of weightings of plural inputs to an artificial neuron of the plurality of artificial neurons being a negative value representing that a membrane potential of the artificial neuron is negative, that a neuron result of the artificial neuron is a value, which is negative; and
      ignoring, in the determination of the result, respective second output spikes, of the output spikes, that are output before the predetermined time, where each of the respective first output spikes and the respective second output spikes may include one or more output spikes; and
      perform the output of the determined result.

15. The inference device according to claim 14, wherein the artificial neuron of the spiking neural network is configured such that charge of the membrane potential is initiated based on a preset value before the input data is received.

16. The inference device according to claim 14, wherein the processor is further configured to control the spiking neural network to perform an inference operation after a predetermined time from an operating time point of the spiking neural network.

* * * * *